United States Patent
Matsuki

(10) Patent No.: US 7,244,286 B2
(45) Date of Patent: Jul. 17, 2007

(54) COPPER ALLOY POWDER FOR ELECTRICALLY CONDUCTIVE PASTE

(75) Inventor: Kensuke Matsuki, Chiba (JP)

(73) Assignee: Kawatetsu Mining Co., Ltd, Tokyo (JP)

( * ) Notice: Subject to any disclaimer, the term of this patent is extended or adjusted under 35 U.S.C. 154(b) by 0 days.

(21) Appl. No.: 10/497,233

(22) PCT Filed: Nov. 28, 2002

(86) PCT No.: PCT/JP02/12451

§ 371 (c)(1),
(2), (4) Date: Jun. 1, 2004

(87) PCT Pub. No.: WO03/047793

PCT Pub. Date: Jun. 12, 2003

(65) Prior Publication Data

US 2005/0142027 A1    Jun. 30, 2005

(30) Foreign Application Priority Data

Dec. 4, 2001 (JP) .............................. 2001-370132

(51) Int. Cl.
*B22F 1/00* (2006.01)
*H01B 1/02* (2006.01)

(52) U.S. Cl. ...................................................... 75/255

(58) Field of Classification Search ................. 75/252, 75/255; 252/512

See application file for complete search history.

(56) References Cited

U.S. PATENT DOCUMENTS

| | | | | | |
|---|---|---|---|---|---|
| 4,540,604 | A | * | 9/1985 | Siuta | 427/97.4 |
| 5,525,761 | A | * | 6/1996 | David et al. | 174/257 |
| 6,086,793 | A | * | 7/2000 | Tani et al. | 427/98.3 |
| 6,679,937 | B1 | * | 1/2004 | Kodas et al. | 75/365 |
| 2002/0068005 | A1 | * | 6/2002 | Meinhardt et al. | 419/65 |

FOREIGN PATENT DOCUMENTS

| JP | A 2-194137 | 7/1990 |
|---|---|---|
| JP | A-11-054368 | 2/1999 |
| JP | A 2001-131655 | 5/2001 |

OTHER PUBLICATIONS

Chemical Abstracts, vol. 130, No. 13, Mar. 29, 1999, Columbus, Ohio, US, Abstract No. 176210, Igarashi Katsuhiko et al., "CR composite electronic parts," XP002425566.

* cited by examiner

*Primary Examiner*—Roy King
*Assistant Examiner*—Ngoclan T. Mai
(74) *Attorney, Agent, or Firm*—Oliff & Berridge, PLC

(57) ABSTRACT

A copper alloy powder for an electrically conductive paste is provided, which is characterized in that the copper alloy powder comprises 80 to 99.9 mass % of Cu and 0.1 to 20 mass % of one or two elements selected from the group consisting of Ta and W and has an average particle size of 0.1 to 1 μm. This copper alloy powder has a higher starting temperature for sintering, higher oxidation resistance and better heat resistance than a copper powder.

4 Claims, 1 Drawing Sheet

COPPER ALLOY POWDER FOR ELECTRICALLY CONDUCTIVE PASTE

TECHNICAL FIELD

The present invention relates to a copper alloy powder for an electrically conductive paste. More specifically, it relates to a copper alloy powder for an electrically conductive paste which is best suited for a case where the copper alloy powder is used as an alloy powder for an internal electrode of a laminated ceramic capacitor.

BACKGROUND ART

A multilayer ceramic capacitor has hitherto been manufactured as follows. A large number of ceramic dielectric sheets onto which a metal powder paste is printed or sprayed are mutually stacked and laminated so as to obtain an electrode structure. After this laminate obtained by stacking and laminating is pressed and bonded into one piece, sintering is performed to connect external lead-out electrodes. This laminated ceramic capacitor has such characteristics that: the capacitance-volume ratio is high, the internal inductance is small, and it can be used in a high frequency band, for example, as high as GHz order, since it is possible to reduce the thickness of effective dielectrics.

Since ceramic dielectrics and internal electrodes are simultaneously sintered for this laminated ceramic capacitor, it is necessary that material for internal electrode has a higher melting point than the sintering temperature of the ceramics and does not react to ceramics. For this reason, noble metals such as Pt and Pd were used in the past as materials for internal electrodes. However, these materials had the disadvantage of high price. In order to eliminate this disadvantage, Ag—Pd alloys have been used as electrode materials by lowering the sintering temperature of dielectric ceramics of 900° C. or more and 1100° C. or less, or internal electrodes using inexpensive base metals have been put to practical use. Recent years have seen requirements for the use of laminated ceramic capacitors that can be operated in a high frequency band higher than the GHz order. For this reason, low electrical resistivity is a prerequisite condition for materials for internal electrodes and at present Cu is regarded as a promising candidate.

However, because of its low melting point Cu has the problem that the cracking and delamination of internal electrodes or poor sintering of dielectrics and the like are apt to occur due to a great temperature difference between melting temperature of Cu and sintering temperature dielectrics. Furthermore, Cu is easily oxidized in the sintering process by the oxygen in the atmosphere, posing the problem that the poor sintering of internal electrodes occurs and the electrical resistivity increases due to the mixing of oxides. Oxidation can be prevented by converting the atmosphere into a reducing one, however, ceramic dielectrics are then reduced and impossible to exhibit their good performance as dielectrics.

Therefore, a metal powder that starts sintering at a higher temperature than Cu and is not oxidized by the atmosphere during sintering is required.

DISCLOSURE OF THE INVENTION

The present invention has been made in view of the above-described situation and has its object to provide a copper alloy powder for an electrically conductive paste which is formed from an alloy comprising mainly Cu and for which it is possible to raise the starting temperature for sintering and improve oxidation resistance in comparison with pure Cu.

The present invention has been made in order to solve the above-described problems and provides a copper alloy powder for an electrically conductive paste, which is characterized in that the copper alloy powder for an electrically conductive paste comprises 80 to 99.9 mass % of Cu and 0.1 to 20 mass % of one or two elements selected from the group consisting of Ta and W, and has an average particle size of 0.1 to 1 µm.

In the present invention, there are added elements which raise the starting temperature for sintering of Cu, increase high-temperature hardness, and do not increase electrical resistivity so much. Also in the present invention, the oxidation resistance can be improved owing to reduction of the activity of Cu and formation of a passive state caused by alloying.

For the elements to be added, a group of elements consisting of Ta and W was selected as metals which have effect on raising the starting temperature for sintering of Cu and which little increase electrical resistivity. If the content of these elements is less than 0.1 mass %, the effect on the raising of the starting temperature for sintering is small and hence little effect on the improvement of oxidation resistance is obtained. If the content exceeds 20 mass %, the increase in electrical resistivity is remarkable and hence the electrical resistance becomes higher than that of Ni which has hitherto been used. Therefore, the content of these elements was limited to the range of 0.1 to 20 mass %. More preferably, the copper alloy powder for an electrically conductive paste comprises 80 to 99.5 mass % of Cu and 0.5 to 20 mass % of one or two elements selected from the group consisting of Ta and W. Components of the balance are not particularly specified.

An average particle size of an alloy powder of the present invention is in the range of 0.1 to 1 µm as a particle size suitable for an electrically conductive paste which forms a uniform film thickness. If the particle size is less than 0.1 µm, screen printing and the like become difficult. If the particle size exceeds 1 µm, variations occur in film thickness. Therefore, the particle size was limited to not more than 1 µm.

It is preferred that the shape of a copper powder particle of the present invention be spherical. This is because a spherical shape is excellent in the dispersibility of the copper alloy powder in a paste and the fluidity of a paste. Furthermore, it is preferred that an alloy powder of the present invention has a starting temperature for oxidation of not less than 250° C. and a starting temperature for sintering of not less than 500° C. as the characteristics of the powder to be sintered.

It is possible to easily produce a copper alloy powder having a uniform spherical particle size by a chemical vapor deposition reaction. For example, a chloride of Cu and a chloride of an alloying element are each heated and vaporized and these vapors are mixed and reduced by a hydrogen gas. The composition of the alloy and the particle size of the powder can be controlled by changing reaction conditions (temperature, reaction time, etc.). It is possible to obtain an alloy of a uniform composition, because in a chemical vapor deposition reaction, different metal elements are mixed together at an atomic level.

An electrically conductive paste can be produced by a conventional method. For example, an electrically conductive paste can be produced by mixing 1 to 5 mass parts of binder such as ethyl cellulose and 5 to 20 mass parts of solvent such as terpineol with 100 mass parts of copper alloy powder.

According to the present invention, a copper alloy powder for an electrically conductive paste which exhibits good operation characteristics in a high frequency band and has small electrical resistivity, a high starting temperature for sintering and improved oxidation resistance can be provided at low cost as a metal for an electrically conductive paste for a multilayer ceramic capacitor.

BEST MODE FOR CARRYING OUT THE INVENTION

Various copper alloy powders in which the alloy components and average particle sizes were different were produced by way of trial, and the starting temperature for sintering, electrical resistivity and weight gain during a temperature rise of each copper alloy powder was measured. The results of the measurement are shown in Table 1, FIG. 1 and FIG. 2.

Regarding starting temperature for sintering, a compact of a powder was produced by compacting a copper alloy powder, an investigation was made into the relationship between the height of the compact (sample height) and temperature as the compact was raised in temperature. The temperature at which the height of the compact decreases to reach 99.5% of the initial height was regarded as the starting temperature for sintering. A weight gain when a temperature rise occurred at a constant rate in air was found by thermal gravimetry. The temperature at which the weight gain reaches 0.2% was regarded as the starting temperature for oxidation. A 50% particle size in a particle size distribution determined by an image analysis of a scanning electron micrograph was regarded as the average particle size.

Table 1 shows Examples No. 1 to No. 15 of the present invention and Comparative Examples No. 1 to No. 7. In each of the examples of the present invention, the starting temperature for sintering is higher than in Comparative Example No. 7 (pure Cu), a weight increase due to oxidation little occurs, and an increase in electrical resistivity is in an allowable range. In contrast to this, electrical resistivity is too high in each of Comparative Examples No. 1 to No. 6.

Figure 1:
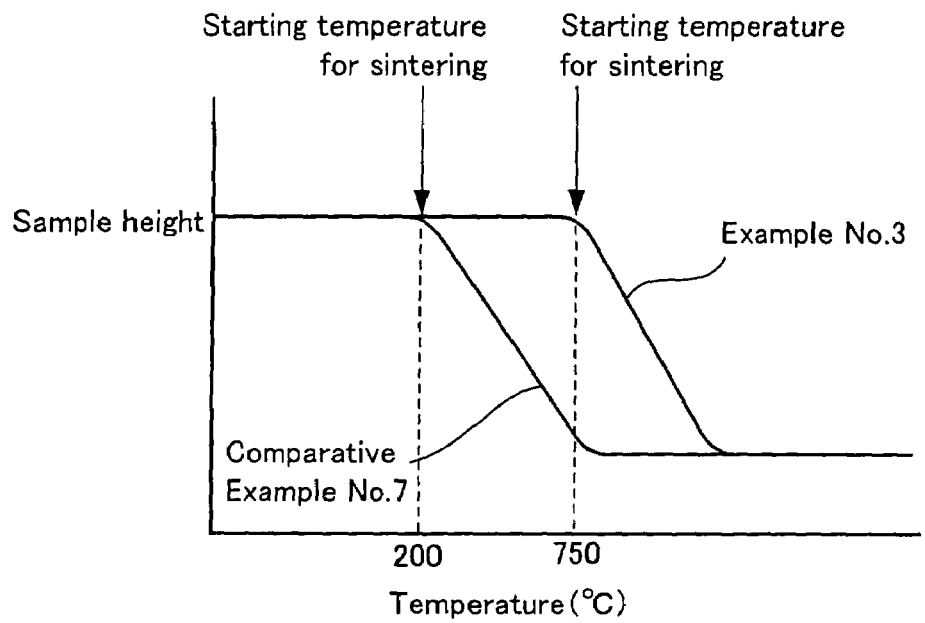
FIG. 1 is a graph which schematically shows the starting temperature for sintering of an example and a comparative example.
Figure 2:
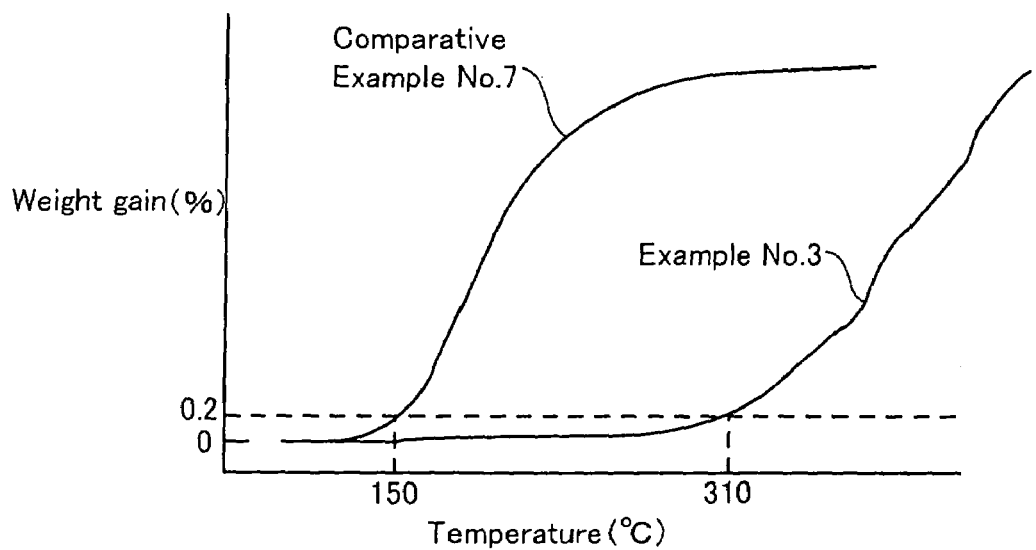
FIG. 2 is a graph which schematically shows the weight gain of an example and a comparative example.

FIG. 1 schematically shows the relationship between temperature and sample height of Example No. 3 (99 mass % Cu, 1 mass % Ta) and Comparative Example No. 7 (pure Cu) shown in Table 1. It is apparent that in Example No. 3 the starting temperature for sintering is higher than in the case of pure Cu. FIG. 2 is a graph which schematically shows a change in the weight of the copper alloy associated with a temperature rise of Example No. 3 and Comparative Example No. 7. The weight change of Example 3 is small and it is apparent that Example No. 3 is less apt to be oxidized.

Dielectric sheets and sheets on which a film of a copper alloy powder of the present invention was deposited were laminated in multiple layers and a multilayer ceramic capacitor was produced by sintering. The multilayer ceramic capacitor thus obtained was free from defects such as cracking and delamination.

Because a copper alloy powder of the present invention has low electrical resistivity and a high starting temperature for sintering and is excellent in oxidation resistance, it is best suited for use in an internal electrode of a multilayer ceramic capacitor.

TABLE 1

| | No. | Composition Mass % | | | Average particle size | Starting temperature for oxidation | Starting temperature for sintering | Electrical resistivity |
|---|---|---|---|---|---|---|---|---|
| | | Cu | Ta | W | μm | °C. | °C. | μΩ·cm |
| Example | 1 | 99.9 | 0.1 | — | 0.5 | 250 | 500 | 1.8 |
| | 2 | 99.5 | 0.5 | — | 0.7 | 300 | 700 | 1.9 |
| | 3 | 99 | 1 | — | 0.4 | 310 | 750 | 2 |
| | 4 | 95 | 5 | — | 0.3 | 310 | 750 | 2.2 |
| | 5 | 90 | 10 | — | 0.1 | 310 | 750 | 2.3 |
| | 6 | 99.9 | — | 0.1 | 0.6 | 260 | 550 | 1.8 |
| | 7 | 99.5 | — | 0.5 | 0.8 | 305 | 710 | 1.9 |
| | 8 | 99 | — | 1 | 1.0 | 310 | 760 | 2 |
| | 9 | 95 | — | 5 | 0.5 | 315 | 760 | 2.1 |
| | 10 | 90 | — | 10 | 0.4 | 315 | 760 | 2.2 |
| | 11 | 99.8 | 0.1 | 0.1 | 0.3 | 265 | 560 | 1.9 |
| | 12 | 99 | 0.5 | 0.5 | 0.7 | 320 | 760 | 2 |
| | 13 | 98 | 1 | 1 | 0.6 | 325 | 760 | 2.2 |
| | 14 | 90 | 5 | 5 | 0.8 | 325 | 760 | 2.3 |
| | 15 | 80 | 10 | 10 | 0.2 | 325 | 760 | 2.5 |
| Comparative Example | 1 | 70 | 30 | — | 0.3 | 320 | 750 | 7.2 |
| | 2 | 60 | 40 | — | 0.2 | 320 | 750 | 8.3 |
| | 3 | 70 | — | 30 | 0.4 | 325 | 760 | 6.9 |
| | 4 | 60 | — | 40 | 0.6 | 325 | 760 | 7.5 |
| | 5 | 70 | 15 | 15 | 0.7 | 320 | 760 | 10.5 |
| | 6 | 60 | 20 | 20 | 0.5 | 325 | 760 | 12.4 |
| | 7 | 100 | — | — | 0.5 | 150 | 200 | 1.7 |

The invention claimed is:

1. A copper alloy powder for an electrically conductive paste, comprising:
   Cu in an amount of from 80 to 99.9 mass %; and
   Ta or a combination of Ta and W in an amount of from 0.1 to 20 mass %;
   wherein the powder has an average particle size of from 0.1 to 1 µm.

2. The copper alloy powder for an electrically conductive paste according to claim 1 wherein:
   Cu is present in an amount of 99.5 mass % or less; and
   Ta or the combination of Ta and W is present in an amount of at least 0.5 mass %.

3. The copper alloy powder for an electrically conductive paste according to claim 1 wherein particles of the powder have a spherical shape.

4. The copper alloy powder for an electrically conductive paste according to claim 2 wherein particles of the powder have a spherical shape.

* * * * *